(No Model.)

J. W. PIERCE & I. L. G. RICE.
TIRE FOR WHEELS.

No. 341,050. Patented May 4, 1886.

WITNESSES.
Chas. Spaulding.
Albert D. Grover.

INVENTORS.
J. Willard Pierce
Ernel L. G. Rice.

UNITED STATES PATENT OFFICE.

J. WILLARD PIERCE AND ISRAEL L. G. RICE, OF BROOKLINE, MASS.

TIRE FOR WHEELS.

SPECIFICATION forming part of Letters Patent No. 341,050, dated May 4, 1886.

Application filed January 11, 1886. Serial No. 188,204. (No model.)

*To all whom it may concern:*

Be it known that we, J. WILLARD PIERCE and ISRAEL L. G. RICE, both citizens of the United States, residing in Brookline, in the county of Norfolk and State of Massachusetts, have invented an Improved Tire for the Wheels of Vehicles, of which the following is a specification.

Our invention relates to a segmental tire, which may be adjusted so that it will press upon the fellies and firmly clamp them when the wheel becomes shrunken. We attain this object by the devices illustrated in the accompanying drawings, in which—

Figure 1:
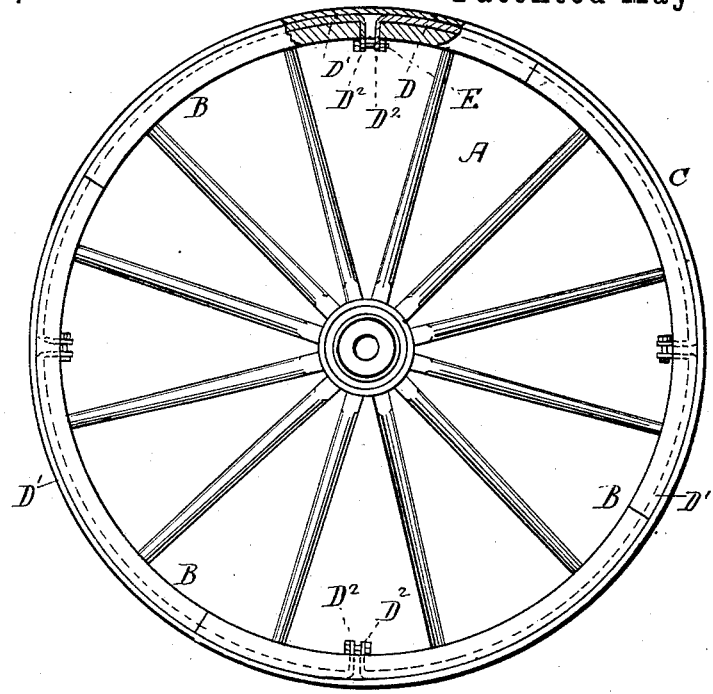
Figure 3:
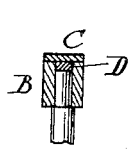
Figure 2:
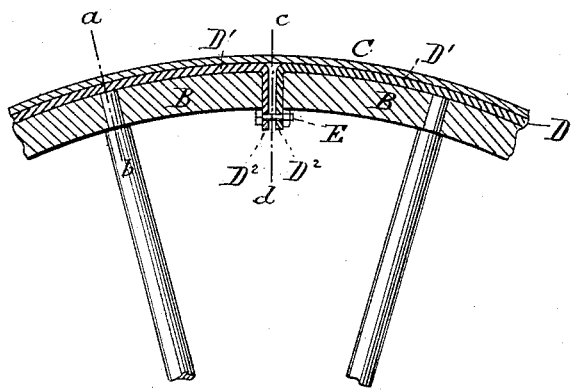
Figure 4:
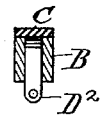

Figure 1 is a vertical view of a wheel embodying our invention. Fig. 2 is an enlarged sectional view of a portion of the wheel. Fig. 3 is a cross-section through the line $a\,b$, and Fig. 4 is a cross section through the line $c\,d$.

Similar letters refer to similar parts throughout the entire views.

The wheel A, having fellies B B B and a common outer smooth tire, C, has an inner tire, D, made in segments D' D' D'. Each segment has two ears, $D^2 D^2$; and through two ears of opposite segments is bored in a straight line a hole through which passes a bolt, E, which unites the two segments when the nut at the end is screwed up. When the wheel is new, the segments are put on, leaving a little space between each pair of ears, so that when the wheel shrinks the nuts may be tightened and the segments drawn close, thus keeping the parts of the wheel firmly together, although much shrinkage takes place.

We do not claim, broadly, the use of bolts and lugs for taking up and allowing expansion in the fellies where but a single tire is used on the wheel.

What we do claim as our invention, and desire to secure by Letters Patent, is—

1. In a wheel, the segmental tire D, with its segments D' D' D', ears $D^2 D^2$, and bolts E E E, adapted to take up the shrinkage of the wheel, substantially as, in the manner, and for the purpose set forth.

2. In a wheel, a segmental tire D, with its segments D' D' D', ears $D^2 D^2$, and bolts E E E, adapted to take up the shrinkage of the wheel, in combination with the outer tire, C, substantially as, in the manner, and for the purpose set forth.

J. WILLARD PIERCE.
ISRAEL L. G. RICE.

Witnesses:
   CHAS. SPAULDING,
   ALBERT D. GROVER.